(12) United States Patent
Kogure

(10) Patent No.: US 10,851,960 B2
(45) Date of Patent: Dec. 1, 2020

(54) VEHICULAR LIGHTING FIXTURE

(71) Applicant: STANLEY ELECTRIC CO., LTD., Tokyo (JP)

(72) Inventor: Shinya Kogure, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/643,849

(22) PCT Filed: Aug. 28, 2018

(86) PCT No.: PCT/JP2018/031716
§ 371 (c)(1),
(2) Date: Mar. 3, 2020

(87) PCT Pub. No.: WO2019/049727
PCT Pub. Date: Mar. 14, 2019

(65) Prior Publication Data
US 2020/0256537 A1   Aug. 13, 2020

(30) Foreign Application Priority Data

Sep. 8, 2017   (JP) .................................. 2017-173140

(51) Int. Cl.
*F21S 41/275*   (2018.01)
*F21V 13/04*   (2006.01)
(Continued)

(52) U.S. Cl.
CPC .............. *F21S 41/275* (2018.01); *F21S 43/40* (2018.01); *F21S 45/00* (2018.01); *F21V 5/04* (2013.01); *F21V 7/08* (2013.01); *F21V 13/04* (2013.01)

(58) Field of Classification Search
CPC .... F21S 43/20; F21S 43/26; F21S 41/25–275; F21V 5/04–048
See application file for complete search history.

(56) References Cited

U.S. PATENT DOCUMENTS

| | | | |
|---|---|---|---|
| 2008/0144328 A1* | 6/2008 | Yagi | F21V 29/763 362/516 |
| 2008/0285297 A1* | 11/2008 | Ishida | F21S 41/143 362/539 |

(Continued)

FOREIGN PATENT DOCUMENTS

| | | | | |
|---|---|---|---|---|
| CN | 102734732 A | * | 10/2012 | .............. F21S 41/26 |
| JP | 2005-183090 A | | 7/2005 | |

(Continued)

OTHER PUBLICATIONS

International Search Report and Written Opinion dated Nov. 27, 2018 for PCT/JP2018/031716 filed on Aug. 28, 2018, 11 pages including English Translation of the International Search Report.

*Primary Examiner* — Mariceli Santiago
(74) *Attorney, Agent, or Firm* — Xsensus LLP

(57) ABSTRACT

A vehicular lighting fixture is a vehicular lighting fixture configured to illuminate a side in front of a vehicle, and includes a parallel light illumination device configured to emit parallel light and a projection optical system configured to project the parallel light emitted from the parallel light illumination device to a forward side, and in the projection optical system, a focal length of a horizontal component is smaller than a focal length of a vertical component.

7 Claims, 6 Drawing Sheets

(51) Int. Cl.
  *F21S 45/00*   (2018.01)
  *F21V 7/08*   (2006.01)
  *F21S 43/40*   (2018.01)
  *F21V 5/04*   (2006.01)

(56) References Cited

U.S. PATENT DOCUMENTS

2013/0114283 A1    5/2013   Kawanobe et al.
2020/0200351 A1*   6/2020   Kogure ................ F21S 41/321

FOREIGN PATENT DOCUMENTS

| JP | 2011-243366 A | 12/2011 |
| JP | 2012-507823 A | 3/2012 |
| JP | 2013-101881 A | 5/2013 |
| JP | 2016-115412 A | 6/2016 |
| WO | 2017/066818 A1 | 4/2017 |

* cited by examiner

VEHICULAR LIGHTING FIXTURE

CROSS-REFERENCE TO RELATED APPLICATIONS

The present application is based on PCT filing PCT/JP2018/031716, filed Aug. 28, 2018, which claims priority to JP 2017-173140, filed Sep. 8, 2017, the entire contents of each are incorporated herein by reference.

TECHNICAL FIELD

The present invention relates to a vehicular lighting fixture.

BACKGROUND ART

Patent Literature 1 discloses a headlight unit for a vehicle including a liquid crystal element in order to selectively emit light to a side in front of a host vehicle.

CITATION LIST

Patent Literature

[Patent Literature 1]
Japanese Unexamined Patent Application, First Publication No. 2016-115412

SUMMARY OF INVENTION

Technical Problem

A lighting fixture having an imaging light forming device such as a liquid crystal shutter emits parallel light to the imaging light forming device and forms a light distribution pattern. However, when a wide light distribution pattern is formed in a horizontal direction suitable for a vehicular lighting fixture, the parallel light before incidence needs to be widened, and there is a problem in that a lighting fixture structure becomes complicated.

An aspect of the present invention is directed to providing a vehicular lighting fixture capable of forming a light distribution pattern suitable for a vehicle.

Solution to Problem

A vehicular lighting fixture of an aspect of the present invention is a vehicular lighting fixture configured to illuminate a side in front of a vehicle, the vehicular lighting fixture including: a parallel light illumination device configured to emit parallel light; and a projection optical system configured to project the parallel light emitted from the parallel light illumination device to a side in front, wherein, in the projection optical system, a focal length of a horizontal component is smaller than a focal length of a vertical component.

According to this configuration, the projection optical system has different focal lengths for the horizontal component and the vertical component, and the focal length of the horizontal component is smaller than the focal length of the vertical component. When the projection optical system is a light condensing optical system (for example, a convex lens), a light condensing angle with respect to a focus of the horizontal component of the light emitted from the projection optical system is greater than a light condensing angle with respect to a focus of the vertical component. Accordingly, a diffusion angle of the light diffusing from the focus of the horizontal component gets greater than a diffusion angle of the light diffusing from the focus of the vertical component. In addition, as another example, when the projection optical system is a diffusion optical system (for example, a concave lens), a diffusion angle of the horizontal component of the light emitted from the projection optical system gets greater than a diffusion angle of the vertical component. Accordingly, irrespective of whether the projection optical system is a light condensing optical system or a diffusion optical system, the projection light distribution pattern formed by the projection optical system becomes wider in the horizontal direction than the vertical component. That is, the vehicular lighting fixture can form a preferable projection light distribution pattern for a vehicle. Further, the projection optical system converts a light intensity surface distribution of the parallel light into angles and performs projection.

In the aspect of the above-mentioned vehicular lighting fixture, the vehicular lighting fixture may include an imaging light forming device that is disposed between the parallel light illumination device and the projection optical system and that is configured to modulate parallel light emitted from the parallel light illumination device and to form imaging light.

According to this configuration, since the imaging light forming device is provided on a route of the parallel light, the light distribution pattern illuminated forward can be changed over time. That is, according to the configuration, the vehicular lighting fixture can perform adaptive driving beam (ADB) control. In addition, the light entering the imaging light forming device can be converted into parallel light and a contrast of the imaging light can be increased.

In the aspect of the above-mentioned vehicular lighting fixture, the parallel light illumination device may have a light source unit configured to radially emit light from a diffusion center, and a collimator optical system configured to convert the light emitted from the light source unit into parallel light.

According to the configuration, the parallel light illumination device configured to emit the parallel light can be configured by providing the light source unit and the collimator optical system configured to convert the light radially emitted from the diffusion center of the light source unit into parallel light.

In the aspect of the above-mentioned vehicular lighting fixture, the collimator optical system may have an incident surface to which a primary light, which is the light emitted from the light source unit to enter the collimator optical system and to pass through the collimator optical system, and an emitting surface from which a secondary light, which is parallel to an optical axis of the collimator optical system, is emitted and a diffusion angle of a horizontal component of the primary light may be greater than a diffusion angle of a vertical component of the primary light.

According to the configuration, the collimator optical system refracts the light entering the incident surface and increases the diffusion angle in the horizontal direction with respect to the diffusion angle in the vertical direction. Accordingly, the light distribution pattern of the parallel light emitted from the emitting surface into the parallel light can become wider in the horizontal direction.

Since the parallel light that forms the light distribution pattern that is wide in the horizontal direction is further widened in the horizontal direction by the projection optical system, it is possible to increase an effect that the projection light distribution pattern is widened in the horizontal direction.

In the aspect of the above-mentioned vehicular lighting fixture, a vertical component of the incident surface may have a hyperbolic shape having a hyperbolic focus that coincides with the diffusion center.

According to the configuration, since the vertical component of the incident surface has a hyperbolic shape using a diffusion center as a hyperbolic focus, the vertical component of the primary light can become parallel light. The collimator optical system can minimize spreading of the light distribution pattern in the vertical direction by forming the vertical component of the light into the parallel light in the incident surface.

In the aspect of the above-mentioned vehicular lighting fixture, a horizontal component of the incident surface may have a hyperbolic shape in which a hyperbolic focus coincides with the diffusion center in a vicinity of the optical axis of the collimator optical system, and may have a shape moving rearward from the hyperbolic shape as it gets outward from the optical axis of the collimator optical system in a horizontal direction.

According to the configuration, since the horizontal component of the incident surface has a hyperbolic shape in which the diffusion center is the hyperbolic focus in the vicinity of the optical axis of the collimator optical system, the horizontal component of the primary light can becomes close to parallel light in the vicinity of the optical axis of the collimator optical system. Accordingly, a density of the light flux emitted from the emitting surface can be increased in the vicinity of the optical axis of the collimator optical system, and it is possible to realize a light distribution pattern in which the vicinity of the center in the horizontal direction is brightened. In addition, according to the above-mentioned configuration, the horizontal component of the incident surface is separated rearward from the hyperbolic shape as it gets outward from the optical axis of the collimator optical system in the horizontal direction. Accordingly, the horizontal component of the primary light can increase the diffusion angle as it gets outward from the optical axis of the collimator optical system in the horizontal direction. The collimator optical system can increase spreading of the light distribution pattern in the horizontal direction and realize a light distribution pattern appropriate for a vehicle by diffusing an outer region of the horizontal component of the light.

In the aspect of the above-mentioned vehicular lighting fixture, the light source unit may have a light source main body, and an elliptical reflecting surface configured to reflect the light emitted from the light source main body and to emit the reflected light toward the collimator optical system, the elliptical reflecting surface may be formed in an elliptical shape based on a pair of elliptical focuses, and the light source main body may be disposed on one of the pair of elliptical focuses, and the other elliptical focus functions as the diffusion center.

According to the configuration, emission rays of a Lambertian distribution emitted from the light source main body, which is disposed on one of the elliptical focuses of the elliptical reflecting surface, can be condensed on the other elliptical focus and can be made to enter the collimator optical system at a narrower angle than that of the light emitted from the light source main body. Accordingly, the light intensity in the vicinity of the optical axis can be increased to form the high illuminance region in the vicinity of the optical axis of the collimator optical system while the light efficiently can enter the collimator optical system.

Advantageous Effects of Invention

According to the aspect of the present invention, it is possible to provide a vehicular lighting fixture capable of forming a light distribution pattern suitable for a vehicle.

DESCRIPTION OF EMBODIMENTS

Figure 1A:
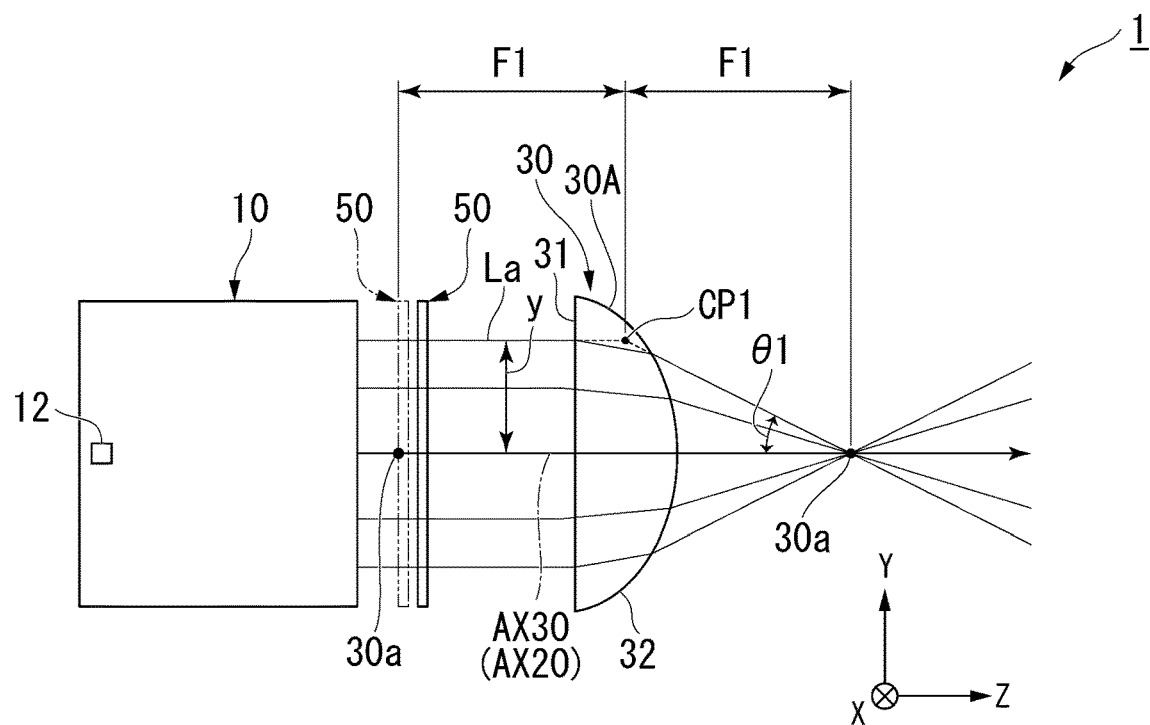
FIG. 1A is an overview schematic diagram of a vehicular lighting fixture of an embodiment, showing a schematic diagram of the vehicular lighting fixture when seen from a horizontal direction.

Hereinafter, a vehicular lighting fixture according to an embodiment of the present invention will be described with reference to the accompanying drawings.

In the drawings used in the following description, characteristic portions may be enlarged for convenience in order to make features easy to understand, and dimensional ratios of elements are not always the same as the actual ones.

In the drawings used in the description of the embodiment, an XYZ coordinate system may be used as a 3-dimensional orthogonal coordinate system. Hereinafter, in the XYZ coordinate system, a Z-axis direction is referred to as a vehicle forward and rearward direction, an X-axis direction is referred to as a vehicle leftward and rightward direction, a Y-axis direction is referred to as a vehicle upward and downward direction, and a +Z side is referred to as a forward side of the vehicle, a −Z side is referred to as a rearward side of the vehicle, and a +Y side is simply referred to as an upward side, and a −Y side is simply referred to as a downward side.

Figure 1B:
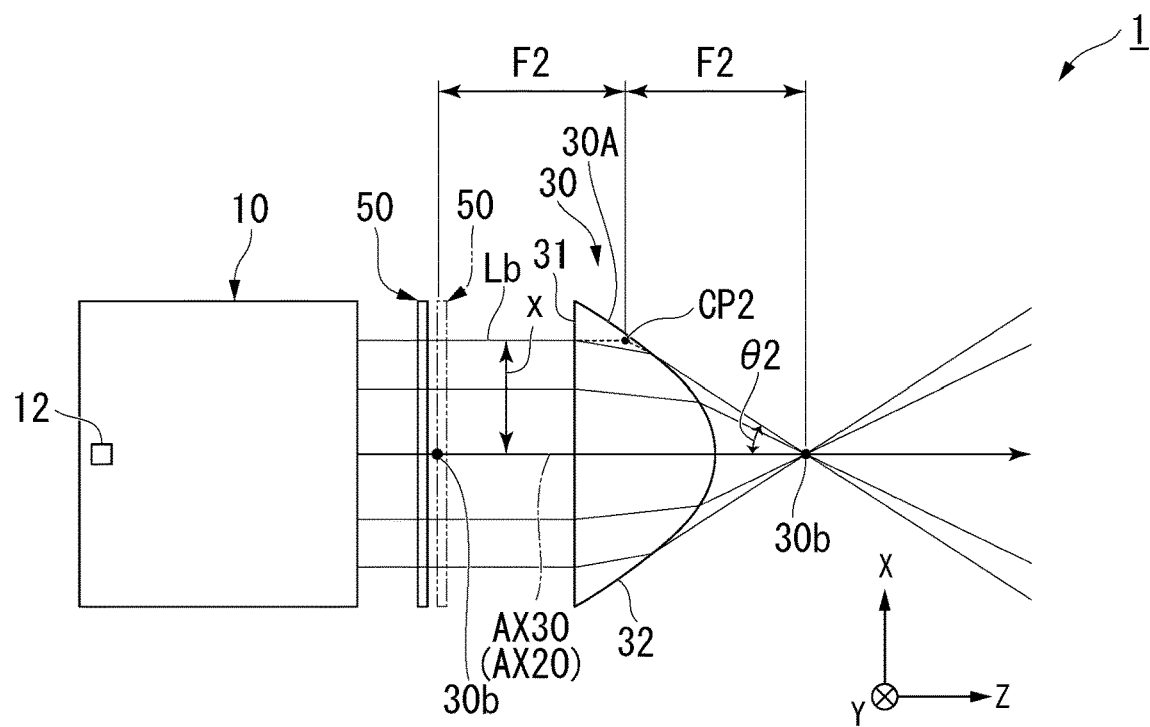
FIG. 1B is an overview schematic diagram of the vehicular lighting fixture of the embodiment, showing a schematic diagram of the vehicular lighting fixture when seen from a vertical direction.

FIGS. 1A and 1B are overview schematic diagrams of a vehicular lighting fixture 1 of the embodiment. FIG. 1A is a schematic diagram of the vehicular lighting fixture 1 when seen from a horizontal direction, and FIG. 1B is a schematic diagram of the vehicular lighting fixture 1 when seen from a vertical direction. The vehicular lighting fixture 1 is mounted on the vehicle and illuminates a side in front of the vehicle (a +Z direction).

The vehicular lighting fixture 1 includes a parallel light illumination device 10, a light condensing optical system (a projection optical system) 30 and an imaging light forming device 50. In addition, the vehicular lighting fixture 1 may include an outer lens (not shown) disposed in front of the light condensing optical system 30. In the vehicular lighting fixture 1, parallel light is emitted from the parallel light illumination device 10. The parallel light is condensed by the light condensing optical system 30 to be projected to a forward side.

<Parallel Light Illumination Device>

Figure 2A:
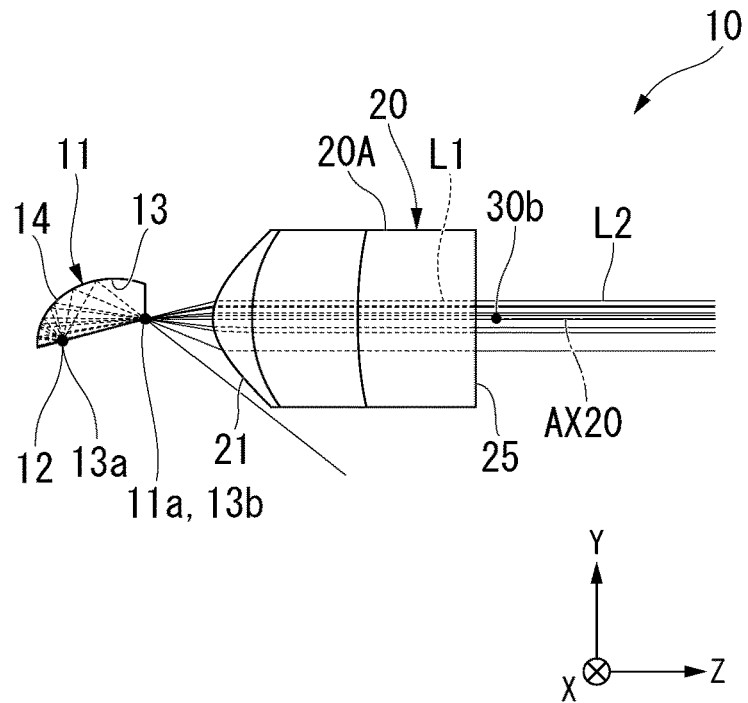
FIG. 2A is a side view of a parallel light illumination device when seen from the horizontal direction in the vehicular lighting fixture of the embodiment.
Figure 2B:
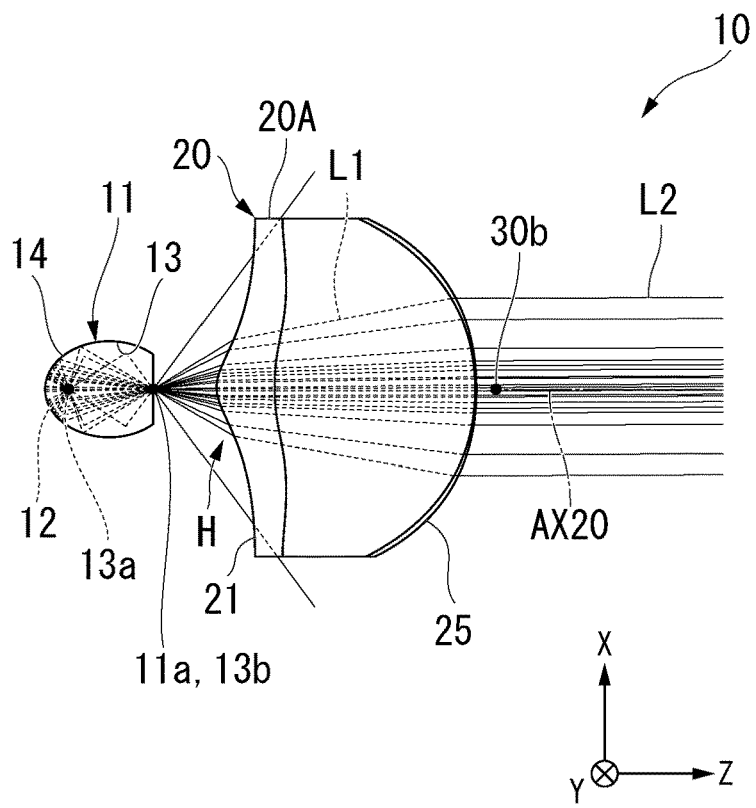
FIG. 2B is a plan view of the parallel light illumination device when seen from the vertical direction in the vehicular lighting fixture of the embodiment.

FIG. 2A is a side view of the parallel light illumination device 10 when seen from the horizontal direction. In addition, FIG. 2B is a plan view of the parallel light illumination device 10 when seen from the vertical direction. The parallel light illumination device 10 emits parallel light. The parallel light illumination device 10 has a light source unit 11 configured to radially emit light from a diffusion center 11a, and a collimator optical system 20 configured to convert the light emitted from the light source unit 11 into parallel light. In addition, the light source unit 11 has a light source main body 12 and a reflecting member 14.

The light source main body 12 emits emission rays of a Lambertian distribution having a central axis directed upward. The emission rays of the Lambertian distribution emitted from the light source main body 12 are reflected forward by the reflecting member 14. A light emitting diode (LED) light source or a laser light source may be employed as the light source main body 12.

The reflecting member 14 has an elliptical reflecting surface 13 configured to reflect light illuminated from the light source main body 12 and illuminate the reflected light toward the collimator optical system 20. That is, the light source unit 11 has the elliptical reflecting surface 13. The elliptical reflecting surface 13 covers the light source main body 12 from above. The elliptical reflecting surface 13 has an elliptical shape based on a pair of elliptical focuses 13a and 13b. That is, the elliptical reflecting surface 13 has an elliptical spherical shape rotated about a long axis passing through the pair of elliptical focuses 13a and 13b.

The light source main body 12 is disposed on the first elliptical focus 13a disposed on a rear side of the pair of elliptical focuses 13a and 13b. The light emitted from the first elliptical focus 13a that is one of the elliptical focuses is reflected by the elliptical reflecting surface 13 and condensed to the second elliptical focus 13b that is the other elliptical focus due to a property of an ellipse. Accordingly, the light emitted from the light source main body 12 is condensed to the second elliptical focus 13b and is radially emitted toward the collimator optical system 20 using the second elliptical focus 13b as the diffusion center 11a. The second elliptical focus 13b functions as the diffusion center 11a of the light source unit 11.

According to the embodiment, the light source unit 11 disposed on the first elliptical focus 13a has the light source main body 12, and the elliptical reflecting surface 13 configured to reflect the light illuminated from the light source main body 12 and to emit the reflected light toward the collimator optical system 20. Accordingly, it is possible to make the emission rays of the Lambertian distribution emitted from the light source main body 12 to enter the collimator optical system 20 at a narrow diffusion angle (narrow angle) at the second elliptical focus 13b. Accordingly, a light intensity in the vicinity of an optical axis AX20 of the collimator optical system 20 can be increased such that a high illuminance region is formed in the vicinity of the optical axis AX20 while the light can efficiently enter the collimator optical system 20. In addition, it is possible to obtain emission with an illuminance gradient in which an illuminance decreases as it goes outward from the high illuminance region by employing the above-mentioned collimator optical system 20.

The collimator optical system 20 has a collimating lens 20A. The collimator optical system 20 of the embodiment is constituted by one collimating lens 20A. However, the collimator optical system 20 may be constituted by a plurality of lenses that coincide with the optical axis AX20 and are arranged along the optical axis AX20.

The collimating lens 20A refracts the light emitted from the diffusion center 11a of the light source unit 11 to make parallel light. The collimating lens 20A is disposed in front of the light source unit 11. The collimating lens 20A has an incident surface 21 and an emitting surface 25. The incident surface 21 faces the light source unit 11 from the front. The incident surface 21 receives the light emitted from the light source unit 11 to make primary light L1 passing through the collimating lens 20A. The emitting surface 25 faces the light condensing optical system 30. The emitting surface 25 refracts the light (the primary light L1) passing through the collimating lens 20A and emits secondary light L2 toward the light condensing optical system 30. The secondary light L2 is light parallel to the optical axis AX20 of the collimating lens 20A (i.e., parallel light).

The light emitted from the light source unit 11 is refracted in the incident surface 21 in a direction approaching the optical axis AX20 of the collimating lens 20A and becomes the primary light L1 passing through the collimating lens 20A. A diffusion angle of a horizontal component of the primary light L1 shown in FIG. 2B is greater than a diffusion angle of a vertical component of the primary light L1 shown in FIG. 2A. That is, an angle formed between the horizontal component of the primary light L1 and the optical axis AX20 is greater than an angle formed between the vertical component of the primary light L1 and the optical axis AX20.

More specifically, in the embodiment, the vertical component of the primary light L1 is substantially parallel to the optical axis AX20. That is, the angle formed between the vertical component of the primary light L1 and the optical axis AX20 is about 0°. Meanwhile, the horizontal component of the primary light L1 is inclined with respect to the optical axis AX20 in a direction away from the optical axis AX20 as it goes forward. That is, the horizontal component of the primary light L1 is diffused to the optical axis AX20.

Further, in the specification, the horizontal component of the light means a direction of advance of light in a plane parallel to a horizontal surface (an X-Z plane), and the vertical component of the light means a direction of advance of light in a surface parallel to a vertical surface (a Y-Z plane).

According to the embodiment, the collimating lens 20A of the collimator optical system 20 refracts the light entering the incident surface 21 to increase a diffusion angle of the horizontal direction with respect to the vertical direction. Accordingly, as a light distribution pattern emitted from the emitting surface 25 as parallel light, it is possible to widened in the horizontal direction with respect to the vertical direction, and a light distribution pattern that is preferable as a vehicular lighting fixture can be formed.

In the incident surface 21 of the collimating lens 20A, a part of the horizontal component and the vertical component have a hyperbolic shape. In general, a hyperbola is constituted by a pair of curves that are continuous with each other. In addition, the hyperbola constituted by the pair of curves is drawn based on the pair of focuses. The pair of focuses of the hyperbola are disposed inside the curves.

The hyperbolic shape in the specification means a curve shape of one of the pair of curves. In addition, the hyperbolic focus in the specification means a focus of one of the pair of focuses that become a reference of the hyperbola, which is not surrounded by the curves that constitute the hyperbolic shape. The hyperbolic focus is disposed behind the incident surface 21 and above the optical axis AX20 of the collimating lens 20A.

As shown in FIG. 2A, the vertical component of the incident surface 21 has a hyperbolic shape in which a hyperbolic focus coincides with the diffusion center 11a of the light source unit 11. By appropriately setting parameters of the hyperbolic shape according to a refractive index of the collimating lens 20A, the light emitted from the hyperbolic focus is refracted at the incident surface 21 having the hyperbolic shape to become the parallel light due to a property of the hyperbolic shape. Accordingly, in the embodiment, the vertical component of the primary light L1 refracted by the incident surface 21 can be made parallel to the optical axis AX20. Accordingly, the collimating lens 20A can minimize spreading of the light distribution pattern emitted forward in the vertical direction.

Further, since the vertical component of the primary light L1 is made parallel to the optical axis AX20 at the incident surface 21, there is no need to refract the vertical component of the primary light L1 at the emitting surface 25. Accordingly, the vertical component of the emitting surface 25 has a linear shape perpendicular to the optical axis AX20.

As shown in FIG. 2B, the horizontal component of the incident surface 21 has a hyperbolic shape H in which a hyperbolic focus coincides with a diffusion center in the vicinity of the optical axis AX20, and has a shape which is separated rearward from the hyperbolic shape H as it goes outward from the optical axis AX20 in the horizontal direction. As described above, by appropriately setting the parameter of the hyperbolic shape according to the refractive index of the collimating lens 20A, the light emitted from the hyperbolic focus is refracted at the incident surface 21 in the vicinity of the optical axis AX20 to become parallel light due to the property of the hyperbolic shape. Accordingly, in the embodiment, the horizontal component of the primary light L1 refracted by the incident surface 21 can be made parallel to the optical axis AX20 in the vicinity of the optical axis AX20. Accordingly, a density of a light flux emitted from the emitting surface 25 can be increased in the vicinity of the optical axis AX20, and a light distribution pattern in which a portion in the vicinity of a center thereof in the horizontal direction is brightened can be realized. In addition, according to the embodiment, the horizontal component of the incident surface 21 is separated rearward from the hyperbolic shape as it goes separated outward from the optical axis AX20 in the horizontal direction. Accordingly, the horizontal component of the primary light L1 can widen the diffusion angle by being separated outward from the optical axis AX20 in the horizontal direction. Accordingly, the collimating lens 20A can increase spreading of the light distribution pattern in the horizontal direction and realize a light distribution pattern appropriate for the vehicle by diffusing a region of the light outside in the horizontal component.

Further, the horizontal component of the primary light L1 advances in a direction inclined with respect to the optical axis AX20 in the incident surface 21, and is refracted by the emitting surface 25 to be emitted toward the light condensing optical system 30 as the secondary light L2 parallel to the optical axis AX20. The horizontal component of the emitting surface 25 has a convex shape protruding toward the light condensing optical system 30.

According to the embodiment, the collimating lens 20A refracts the light entering the incident surface 21, and increases the diffusion angle in the horizontal direction with respect to the diffusion angle in the vertical direction. Accordingly, the light distribution pattern of the light emitted from the emitting surface 25 as parallel light can be widened in the horizontal direction, and the preferable light distribution pattern can be formed as the vehicular lighting fixture 1.

In addition, in the specification, the vertical component of the incident surface 21 means a cross-sectional shape of the incident surface 21 in the vertical direction. In other words, the vertical component of the incident surface 21 means a surface shape of the incident surface 21 in a cross section parallel to the vertical surface (the Y-Z plane) parallel to the optical axis AX20. Similarly, in the specification, the horizontal component of the incident surface 21 means a cross-sectional shape of the incident surface 21 in the horizontal direction. In other words, the horizontal component of the incident surface 21 means a surface shape of the incident surface 21 in a cross section parallel to the horizontal surface (the X-Z plane).

<Light Condensing Optical System>

Figure 3A:
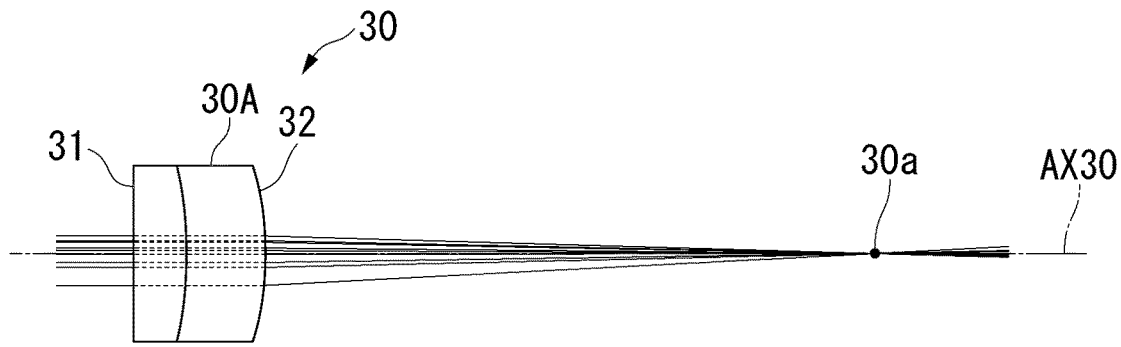
FIG. 3A is a side view of a light condensing optical system when seen from the horizontal direction in the vehicular lighting fixture of the embodiment.
Figure 3B:
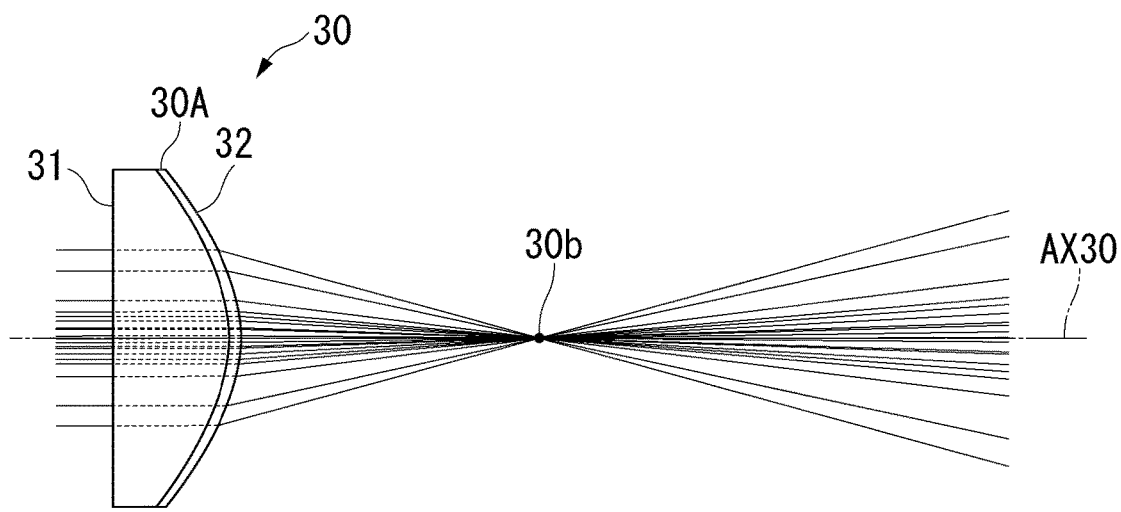
FIG. 3B is a plan view of the light condensing optical system when seen from the vertical direction in the vehicular lighting fixture of the embodiment.

FIG. 3A is a side view of the light condensing optical system 30 when seen from the horizontal direction. In addition, FIG. 3B is a plan view of the light condensing optical system 30 when seen from the vertical direction. A condensing lens 30A functions as a projection optical system. An optical axis AX30 of the light condensing optical system 30 coincides with the optical axis AX20 of the collimator optical system 20 of the parallel light illumination device 10. The light condensing optical system 30 condenses the parallel light emitted from the parallel light illumination device 10.

The light condensing optical system 30 has the condensing lens 30A. The light condensing optical system 30 of the embodiment is constituted by one condensing lens 30A. However, the light condensing optical system 30 may be constituted by a plurality of lenses coinciding with the optical axis AX30 and arranged along the optical axis AX30.

As shown in FIGS. 1A and 1B, the light condensing optical system 30 is disposed in front of the parallel light illumination device 10. The condensing lens 30A has an incident surface 31 and an emitting surface 32. The parallel light emitted from the parallel light illumination device 10 enters the condensing lens 30A in the incident surface 31. In the embodiment, the incident surface 31 is a plane perpendicular to the optical axis AX30. Accordingly, the light entering the condensing lens 30A is not refracted by the incident surface 31. The light passing through the condensing lens 30A is emitted to a side in front of the condensing lens 30A in the emitting surface 32. In the embodiment, the emitting surface 32 is a convex surface shape protruding forward. The light passing through the condensing lens 30A is refracted toward the optical axis AX30 in the emitting surface 32.

In a surface shape of the emitting surface 32, the horizontal component and the vertical component are different from each other. For this reason, the light emitted from the emitting surface 32 connects different focuses in the horizontal component and the vertical component (a vertical component focus 30a and a horizontal component focus 30b). That is, the light condensing optical system 30 configures the vertical component focus 30a and the horizontal component focus 30b. The vertical component focus 30a and the horizontal component focus 30b coincide with the optical axis AX30 of the light condensing optical system 30. As shown in FIGS. 1A and 1B, a focal length F2 of the horizontal component of the condensing lens 30A is smaller than a focal length F1 of the vertical component.

Here, in the specification, the vertical component focus 30a means a point at which light is mostly condensed when an optical path of the parallel light entering the light condensing optical system 30 and refracted by the light condensing optical system 30 is seen from the horizontal direction as shown in FIG. 1A. Similarly, the horizontal component focus 30b means a point at which light is mostly condensed when an optical path of parallel light entering the light condensing optical system 30 and refracted by the light condensing optical system 30 is seen from the vertical direction as shown in FIG. 1B. Accordingly, the vertical component focus 30a and the horizontal component focus 30b need not necessarily be optical focuses in a strict sense.

According to the embodiment, in the light condensing optical system 30, focal lengths of the horizontal component and the vertical component are different from each other, and the focal length F2 of the horizontal component is smaller than the focal length F1 of the vertical component. Accordingly, a light condensing angle to the horizontal component focus 30b (hereinafter, a horizontal component light condensing angle θ2) is greater than a light condensing angle to the vertical component focus 30a (hereinafter, a vertical component light condensing angle θ1). Accordingly, a diffusion angle of the light diffusing from the horizontal component focus 30b is greater than a diffusion angle of the light diffusing from the vertical component focus 30a. As a result, in the projection light distribution pattern formed by the light condensing optical system 30, the horizontal direction with respect to the vertical component is widened. That is, according to the vehicular lighting fixture 1 of the embodiment, a preferable projection light distribution pattern for a vehicle can be formed.

The vertical component of the condensing lens 30A shown in FIG. 1A will be described.

Light La entering the condensing lens 30A passing through a point separated from the optical axis AX30 of the condensing lens 30A by a distance y with respect to the optical axis AX30 in the vertical direction is emitted to a vertical component focus (condensing point) 30a of the condensing lens 30A at the vertical component light condensing angle θ1 with respect to the optical axis AX30 and is projected to a side in front of the vehicle. Here, the vertical component light condensing angle θ1 is expressed by the following equation.

$$\theta1 = \tan^{-1}(y/F1)$$

The focal length F1 of the vertical component is a distance from an intersection point CP1 in a lens on an extension line of an optical path before and after incidence and emission of the condensing lens 30A until the vertical component focus 30a.

The horizontal component of the condensing lens 30A shown in FIG. 1B will be described.

Light Lb entering the condensing lens 30A passing through a point separated from the optical axis AX30 of the condensing lens 30A by a distance x with respect to the optical axis AX30 in the horizontal direction is emitted to a horizontal component focus (condensing point) 30b of the condensing lens 30A at the horizontal component light condensing angle θ2 with respect to the optical axis AX30 and is projected to a side in front of the vehicle. Here, the horizontal component light condensing angle θ2 is expressed by the following equation.

$$\theta2 = \tan^{-1}(x/F2)$$

The focal length F2 of the horizontal component is a distance from an intersection point CP2 in the lens on the extension line of the optical path before and after incidence and emission of the condensing lens 30A until the horizontal component focus 30b.

The condensing lens 30A configures the vertical component focus 30a and the horizontal component focus 30b in the front as described above, and also configures the vertical component focus 30a and the horizontal component focus 30b corresponding thereto in the rear. The focal lengths F1 of the pair of vertical component focuses 30a disposed in front of and behind the condensing lens 30A coincide with each other. In addition, the focal lengths F2 of the pair of horizontal component focuses 30b disposed in front of and behind the condensing lens 30A coincide with each other.

In the embodiment, the condensing lens 30A is the convex lens in which the incident surface 31 is a flat surface and the emitting surface 32 is a convex surface. However, the condensing lens 30A is an example, and a configuration thereof is not limited to the embodiment. For example, the condensing lens 30A in which both of the incident surface 31 and the emitting surface 32 are convex surfaces may be employed.

As described above, the light condensing optical system 30 may be constituted by a plurality of condensing lenses. For example, as an example, the light condensing optical system 30 may be configured by disposing a cylindrical lens configured to condense light in the horizontal direction and a cylindrical lens configured to condense light in the vertical direction on front and rear sides along the optical axis AX30. In this case, the horizontal component focus may be disposed closer to the emitting surface of the cylindrical lens disposed on the front side than the vertical component focus.

<Image Light Forming Device>

The imaging light forming device 50 modulates light and forms imaging light. In the embodiment, the imaging light forming device 50 is a transmissive type liquid crystal panel that forms imaging light when light passes therethrough. Further, the imaging light forming device 50 may be a reflective type liquid crystal panel, or may be a digital mirror device (DMD) that forms imaging light when light is reflected by a plurality of pivotable micromirrors arranged in an array (matrix) shape. The light entering the light condensing optical system can be formed as the imaging light and the light distribution pattern illuminated forward can be changed over time by disposing the imaging light forming device 50 in the route from the light source main body 12 to the light condensing optical system 30. That is, according to the configuration, the vehicular lighting fixture can perform adaptive driving beam (ADB) control.

Hereinafter, in the description of the embodiment, the imaging light forming device is referred to as a liquid crystal panel 50.

The liquid crystal panel 50 is disposed between the parallel light illumination device 10 and the light condensing optical system 30. That is, the parallel light illumination device 10 allows some of the light that becomes parallel light to pass therethrough and blocks the other light to form imaging light on the liquid crystal panel 50. Since the light passing through the liquid crystal panel 50 can be formed into parallel light by disposing the liquid crystal panel 50 between the parallel light illumination device 10 and the light condensing optical system 30, clearer imaging light can be formed. That is, according to the embodiment, since the imaging light is formed by the liquid crystal panel 50 using the parallel light illuminated from the parallel light illumination device 10, a clearer light distribution pattern can be formed.

The liquid crystal panel 50 is disposed to be perpendicular to the optical axis AX30 of the collimator optical system 20.

That is, the liquid crystal panel 50 is disposed to be perpendicular to the entering parallel light. Accordingly, it is possible to increase a contrast of the imaging light formed by the liquid crystal panel 50.

In general, it is known that the liquid crystal element used in the liquid crystal panel has a transmissive performance that is changed by an incidence angle of light. That is, while the liquid crystal element has the highest contrast (light and shade transmissivity ratio) with respect to the light from a specified angle (for example, a direction perpendicular to the liquid crystal panel), the liquid crystal element has a property in which the contrast is decreased as it is deviated from the specified angle. For this reason, when the light entering the liquid crystal element has an angle distribution, the light and shade transmissivity ratio of the entire imaging light is also decreased according to a decrease in contrast of a region into which the light mostly deviated from the specified angle enters.

According to the embodiment, only the light having the incidence angle at which the contrast of the liquid crystal panel 50 is mostly increased can be used and the light and shade transmissivity ratio of the imaging light can be increased by disposing the liquid crystal panel 50 to be perpendicular to the parallel light. That is, according to the embodiment, it is possible to provide the vehicular lighting fixture 1 that forms a clear light distribution pattern.

In this way, the liquid crystal panel 50 exhibits a high performance when the parallel light enters. Accordingly, the vehicular lighting fixture 1 of the embodiment exhibits the highest effect when the liquid crystal panel 50 is used as the imaging light forming device.

The liquid crystal panel 50 is disposed between the vertical component focus 30*a* and the horizontal component focus 30*b* that are disposed behind the light condensing optical system 30. The liquid crystal panel 50 can form a clear light distribution pattern even though non-parallel light is included in the light illuminated from the parallel light illumination device 10 when the liquid crystal panel 50 is disposed at a focus behind the light condensing optical system 30. According to the embodiment, since the liquid crystal panel 50 is disposed between the vertical component focus 30*a* and the horizontal component focus 30*b* disposed behind the light condensing optical system 30, it is possible to form imaging light with a good balance of contrast in the horizontal direction and the vertical direction.

The liquid crystal panel 50 may be disposed on the vertical component focus 30*a* as shown by a virtual line (a two-dot chain line) in FIG. 1A. In this case, it is possible to increase the contrast of the imaging light in the vertical direction formed by the liquid crystal panel 50.

In addition, the liquid crystal panel 50 may be disposed on the horizontal component focus 30*b* as shown by the virtual line (the two-dot chain line) in FIG. 1B. In this case, it is possible to increase the contrast of the imaging light in the horizontal direction formed by the liquid crystal panel 50.

(Variant)

Figure 4A:
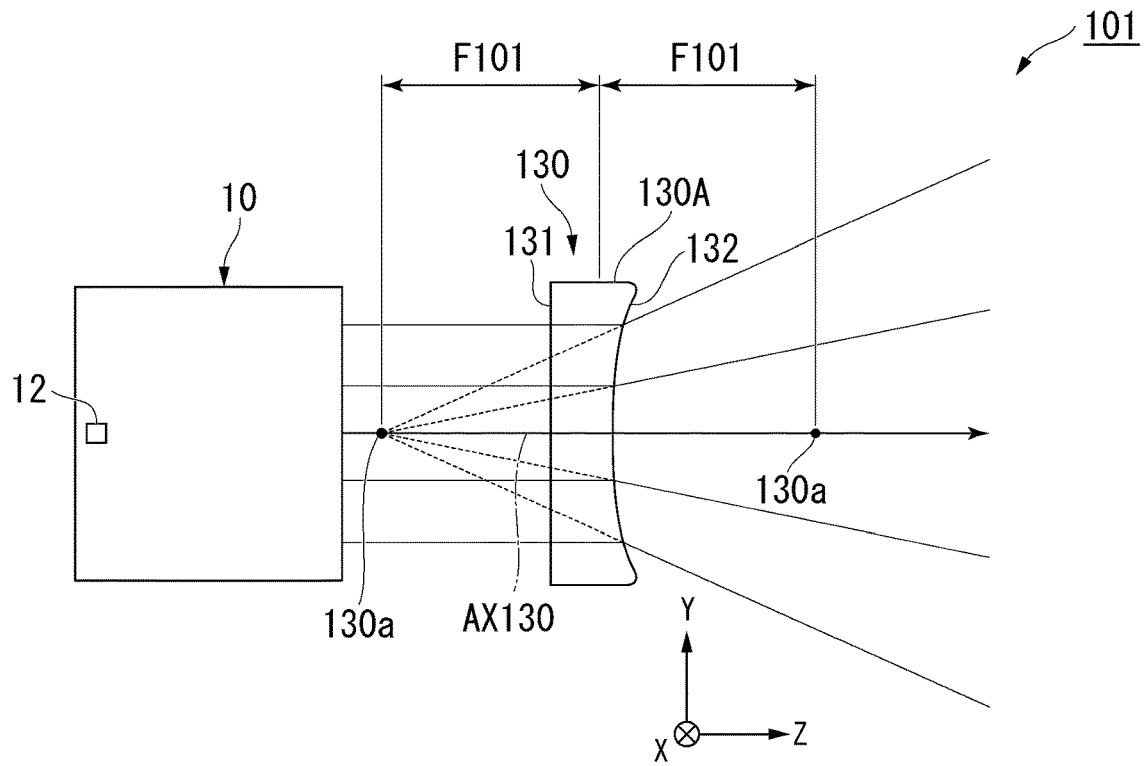
FIG. 4A is an overview schematic diagram of a vehicular lighting fixture of a variant, showing a schematic diagram of the vehicular lighting fixture when seen from the horizontal direction.
Figure 4B:
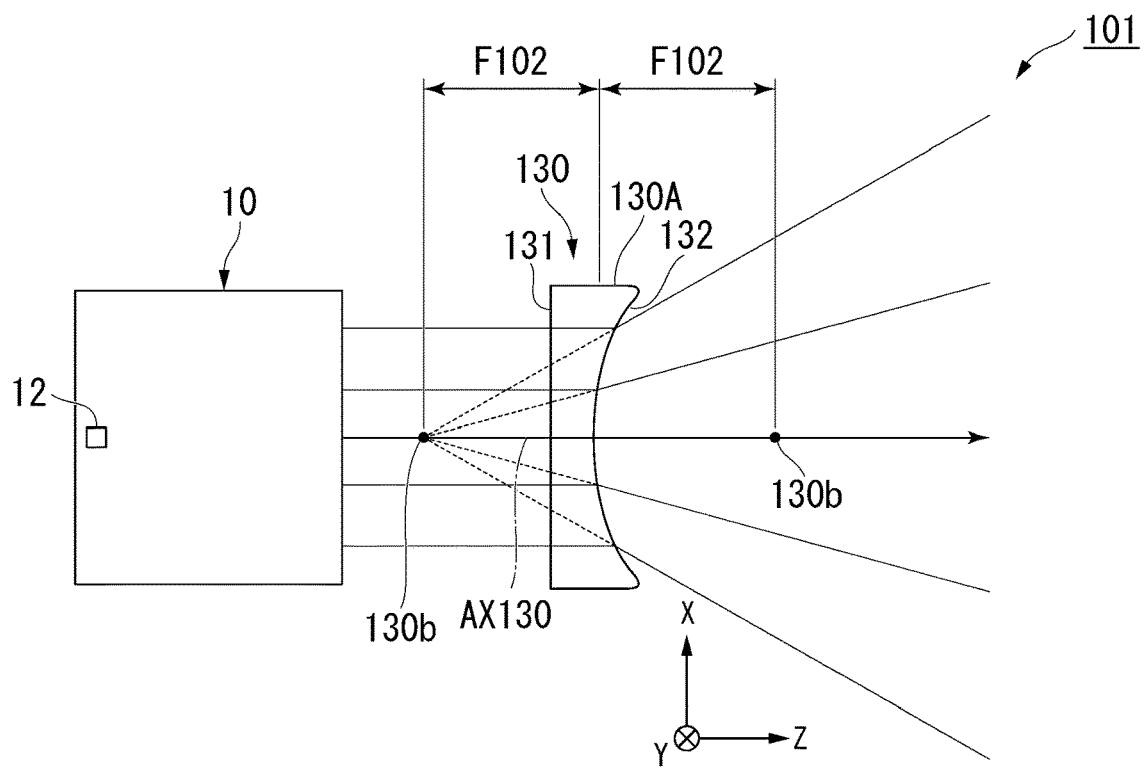
FIG. 4B is an overview schematic diagram of the vehicular lighting fixture of the variant, showing a schematic diagram of the vehicular lighting fixture when seen from the vertical direction.

FIGS. 4A and 4B are overview schematic diagrams of a vehicular lighting fixture 101 of a variant. FIG. 4A is a schematic diagram of the vehicular lighting fixture 101 when seen from the horizontal direction, and FIG. 4B is a schematic diagram of the vehicular lighting fixture 101 when seen from the vertical direction. The vehicular lighting fixture 101 is mounted on the vehicle and illuminates light to a side in front of the vehicle (the +Z direction).

The vehicular lighting fixture 101 includes the parallel light illumination device 10 and a diffusion optical system (a projection optical system) 130. In the vehicular lighting fixture 101, the parallel light is emitted from the parallel light illumination device 10. The parallel light is diffused by the diffusion optical system 130 and projected forward.

The diffusion optical system 130 has a diffusion lens 130A. The diffusion optical system 130 of the variant is constituted by one diffusion lens 130A. However, the diffusion optical system 130 may be constituted by a plurality of lenses coinciding with an optical axis AX130 and arranged along the optical axis AX130.

The diffusion optical system 130 is disposed in front of the parallel light illumination device 10. The diffusion lens 130A has an incident surface 131 and an emitting surface 132. The parallel light emitted from the parallel light illumination device 10 enters the diffusion lens 130A in the incident surface 131. In the variant, the incident surface 131 is a plane perpendicular to the optical axis AX130. Accordingly, the light entering the diffusion lens 130A is not refracted by the incident surface 131. The light passing through the diffusion lens 130A is emitted to a side in front of the diffusion lens 130A in the emitting surface 132. In the variant, the emitting surface 132 has a concave surface shape recessed rearward. The light passing through the diffusion lens 130A is refracted in a direction away from the optical axis AX130 in the emitting surface 132.

A surface shape of the emitting surface 132 has a horizontal component and a vertical component that are different from each other. For this reason, the light emitted from the emitting surface 132 connects focuses (a vertical component focus 130*a* and a horizontal component focus 130*b*) that are different from each other in the horizontal component and the vertical component. That is, the diffusion optical system 130 configures the vertical component focus 130*a* and the horizontal component focus 130*b*. The vertical component focus 130*a* and the horizontal component focus 130*b* coincide with the optical axis AX130 of the diffusion optical system 130. The focal length F102 of the horizontal component of the diffusion lens 130A is smaller than the focal length F101 of the vertical component.

According to the variant, the diffusion optical system 130 has different focal lengths of the horizontal component and the vertical component, and the focal length F102 of the horizontal component is smaller than the focal length F101 of the vertical component. Accordingly, a diffusion angle of the horizontal component of the light emitted from the diffusion optical system 130 is greater than a diffusion angle of the vertical component. As a result, the projection light distribution pattern formed by the diffusion optical system 130 becomes wider in the horizontal direction than the vertical component. That is, according to the vehicular lighting fixture 101 of the variant, a preferable projection light distribution pattern for a vehicle can be formed.

EXAMPLE

Hereinafter, the effect of the present invention is made clearer by the example. Further, the present invention is not limited to the following example, and may be appropriately modified without departing from the scope of the present invention.

Figure 5:
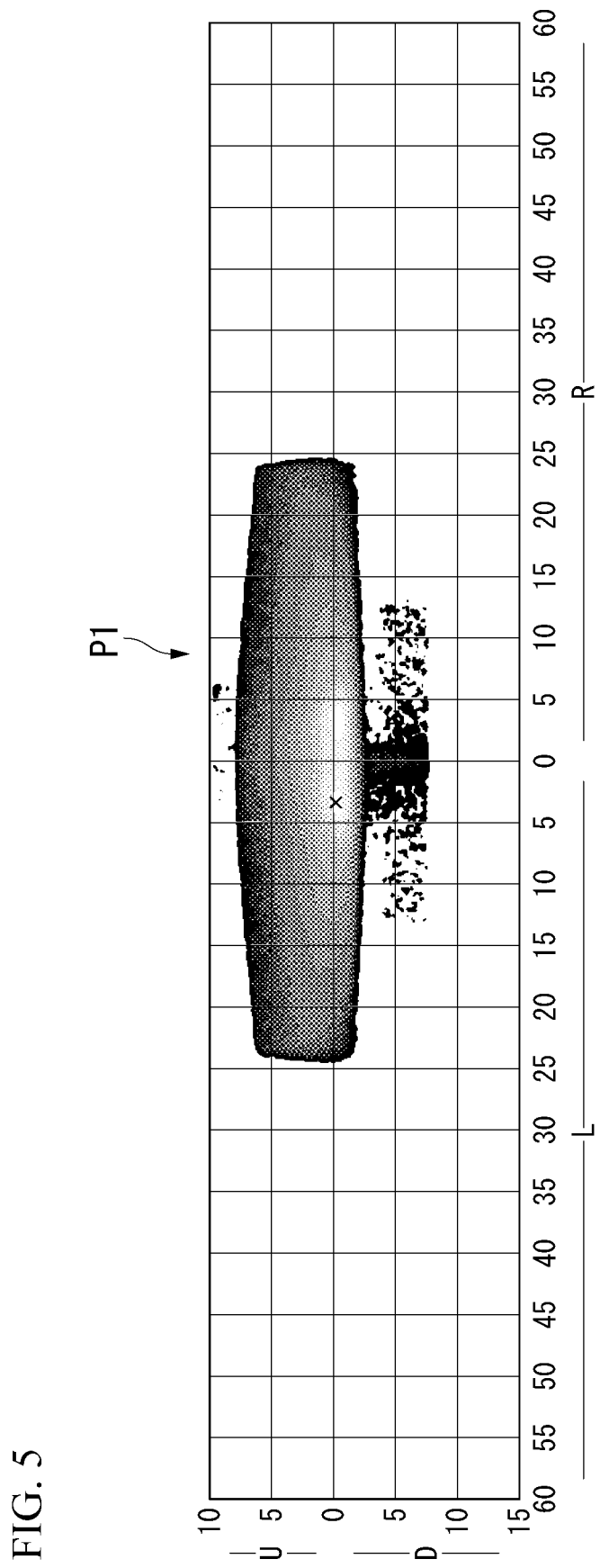
FIG. 5 is a view showing an example of a simulation result of a light distribution pattern of the embodiment.
Figure 6:
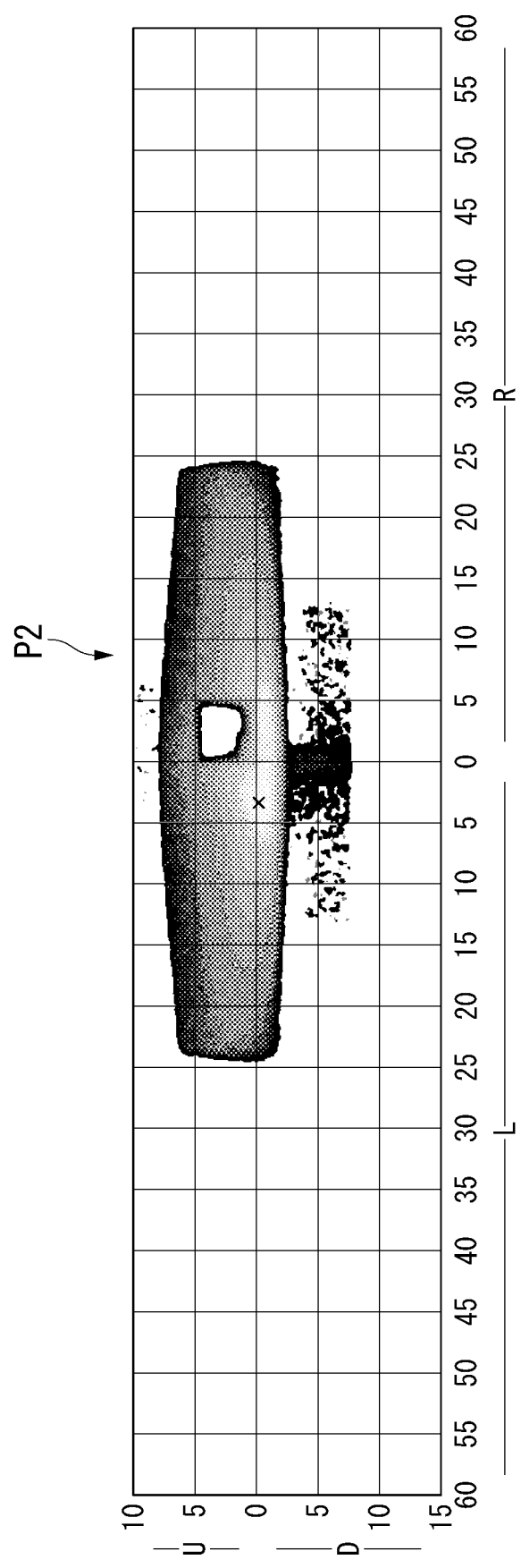
FIG. 6 is a view showing an example of a simulation result of a light distribution pattern of the embodiment.

FIGS. 5 and 6 show simulation results of a light distribution pattern P1 with respect to a virtual vertical screen facing the vehicular lighting fixture 1 in the vehicular lighting fixture 1 of the above-mentioned embodiment. In the light distribution pattern P1 shown in FIG. 5, the liquid crystal panel 50 allows the entire light to pass therethrough. In addition, in a light distribution pattern P2 shown in FIG. 6, the liquid crystal panel 50 blocks light at an angle of 5° on one side in the horizontal direction and the vertical direction.

As shown in FIGS. 5 and 6, the light distribution patterns P1 and P2 become wider in the horizontal direction than in the vertical direction while the high illuminance zone is provided at a center, and are configured in preferable shapes as the light distribution patterns of the vehicular lighting fixture. In addition, when the entire light flux of the light distribution patterns P1 and P2 is confirmed, even though loss of the light in the outer lens (omitted in the drawings) is considered, an efficiency of utilization of the light is equal to or greater than 50%. Accordingly, according to the vehicular lighting fixture 1 of the embodiment, the preferable light distribution patterns P1 and P2 having a high efficiency and designability can be formed. Meanwhile, the efficiency of utilization of the light is an index that expresses a ratio of light flux illuminated to the forward side with respect to the entire light flux illuminated from the light source main body as a percentage.

As shown in FIG. 6, the light distribution pattern P2 forms a region to which the light is partially not illuminated. According to the vehicular lighting fixture 1 of the embodiment, it is possible to clearly perform ADB control of partially masking illumination of light by disposing the liquid crystal panel 50 in the optical path.

Hereinabove, while various embodiments of the present invention have been described, the configurations in the embodiments, combinations thereof, and the like, are exemplary, and additions, omissions, substitutions and other modifications of the configurations may be made. In addition, the present invention is not limited by the embodiments.

In the embodiment, the light source main body 12 illuminates emission rays of a Lambertian distribution. However, high illuminance light distribution can be realized by a simple configuration using a narrow angle emission light source as the light source main body 12. In addition, the laser light source may be used into the parallel light illumination device 10.

REFERENCE SIGNS LIST

1, 101 Vehicular lighting fixture
10 Parallel light illumination device
11 Light source unit
11*a* Diffusion center
12 Light source main body
13 Elliptical reflecting surface
13*a* Elliptical focus
20 Collimator optical system
20A Collimating lens
21, 31 Incident surface
25, 32 Emitting surface
30 Light condensing optical system (projection optical system)
30A Condensing lens
30*a*, 130*a* Vertical component focus (focus)
30*b*, 130*b* Horizontal component focus (focus)
50 Liquid crystal panel (imaging light forming device)
130 Diffusion optical system (projection optical system)
130A Diffusion lens
AX20, AX30, AX130 Optical axis
F1, F101 Focal length (focal length of vertical component)
F2, F102 Focal length (focal length of horizontal component)
H Hyperbolic shape
L1 Primary light
L2 Secondary light

The invention claimed is:

1. A vehicular lighting fixture configured to illuminate a side in front of a vehicle, the vehicular lighting fixture comprising:
a parallel light illumination device configured to emit parallel light; and
a projection optical system configured to project the parallel light emitted from the parallel light illumination device to a forward side,
wherein, in the projection optical system, a focal length of a horizontal component is smaller than a focal length of a vertical component.

2. The vehicular lighting fixture according to claim 1, comprising an imaging light forming device that is disposed between the parallel light illumination device and the projection optical system and that is configured to modulate the parallel light emitted from the parallel light illumination device and to form imaging light.

3. The vehicular lighting fixture according to claim 1, wherein the parallel light illumination device has a light source unit configured to radially emit light from a diffusion center, and a collimator optical system configured to convert the light emitted from the light source unit into parallel light.

4. The vehicular lighting fixture according to claim 3, wherein the collimator optical system has an incident surface to which a primary light, which is the light emitted from the light source unit to enter the collimator optical system and to pass through the collimator optical system, and an emitting surface from which a secondary light, which is parallel to an optical axis of the collimator optical system, is emitted, and
a diffusion angle of a horizontal component of the primary light is greater than a diffusion angle of a vertical component of the primary light.

5. The vehicular lighting fixture according to claim 4, wherein a vertical component of the incident surface has a hyperbolic shape having a hyperbolic focus that coincides with the diffusion center.

6. The vehicular lighting fixture according to claim 4, wherein a horizontal component of the incident surface has a hyperbolic shape in which a hyperbolic focus coincides with the diffusion center in a vicinity of the optical axis of the collimator optical system, and has a shape moving rearward from the hyperbolic shape as it is goes outward from the optical axis of the collimator optical system in a horizontal direction.

7. The vehicular lighting fixture according to claim 3, wherein the light source unit has a light source main body, and an elliptical reflecting surface configured to reflect the light emitted from the light source main body and to emit the reflected light toward the collimator optical system, the elliptical reflecting surface is formed in an elliptical shape based on a pair of elliptical focuses, and the light source main body is disposed on one of the pair of elliptical focuses, and the other elliptical focus functions as the diffusion center.

* * * * *